United States Patent

[11] 3,590,207

[72] Inventor Gerald S. Cox
 Waynesboro, Va.
[21] Appl. No. 833,261
[22] Filed June 16, 1969
[45] Patented June 29, 1971
[73] Assignee General Electric Company

[54] METHOD OF JOINING WIRES OF DIFFERENT DIAMETERS
 4 Claims, 2 Drawing Figs.
[52] U.S. Cl. .................................................. 219/85,
 140/112, 219/92
[51] Int. Cl. ............................................. B23k 11/10
[50] Field of Search ......................................... 140/111,
 112; 29/489, 492

[56] References Cited
 UNITED STATES PATENTS
3,315,711 4/1967 Allen .......................... 140/112
3,337,711 8/1967 Garscia ....................... 219/92

Primary Examiner—Granville Y. Custer, Jr.
Attorneys—Joseph B. Forman, Michael Masnik, Frank L. Neuhauser and Oscar B. Waddell ABSTRACT: A fine enamel insulated wire is joined to a heavier diameter wire by a method including the boriding and plating of the heavier wire, wrapping the fine wire about the heavier wire, and heating the heavier wire sufficiently to burn away the insulation and fuse the two wires together.

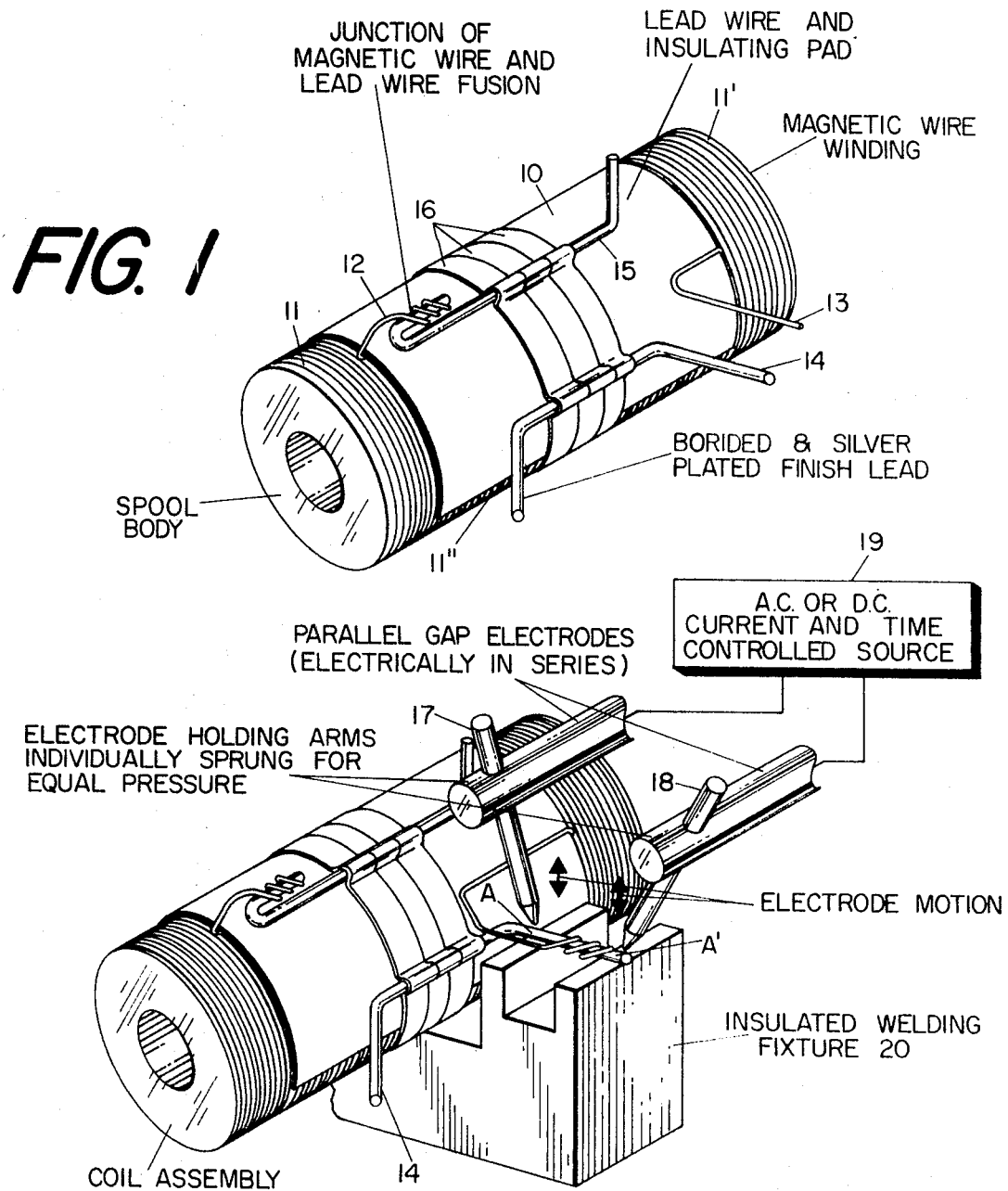

METHOD OF JOINING WIRES OF DIFFERENT DIAMETERS

BACKGROUND OF THE INVENTION

The invention relates to a method of joining wires of different diameters; more particularly, it relates to a method of joining wires wherein a fine enamel insulated wire is joined to a heavier lead wire such as in situations involving the provision of lead wires for termination of magnet wire coils.

It is difficult and often time-consuming to prepare and interconnect fine magnet wire to the heavier diameter uninsulated wire with which it must be connected to form functioning circuitry. One common technique in the past involved first stripping the enamel from the fine wire with a chemical solvent, and thereafter soldering or clamping it to the heavier diameter wire.

It will be appreciated that the prior techniques led to numerous difficulties. The use of chemical strippers required great care in order to avoid stripping more than the end of the wire desired to be joined and/or to avoid damage to the adjacent coil structure. Where mechanical jointing was employed, the unavoidable stresses upon the fine wire easily led to rupture. On the other hand, the utilization of high temperature solders made it difficult to assure the attainment of a reliable joint with each attempt; and the attendant use of flux and consequent corrosive residues tended to contaminate the joint, making it necessary to include an additional cleaning step after every joining step was completed.

SUMMARY OF THE INVENTION

An object of the present invention is to provide an improved method of joining wires of different diameters.

Another object of the invention is to provide an improved method of joining wires of different diameters wherein one of the wires is coated with an insulation which can be burned away or thermally decomposed.

Yet another object of the invention is to provide an improved method of joining wires of different diameters without the use of solder or mechanical clamping.

A more specific object of the present invention is to provide an improved method of joining fine enamel insulated wires, such as magnet wires, to uninsulated larger diameter lead wires.

In accordance with one embodiment of the invention, there is provided a method of joining wires of different diameters wherein the smaller wire is enamel coated, the larger wire can be treated by the boride process and is silver plated, wrapping the smaller wire around the larger diameter wire, and heating the larger diameter wire sufficiently to burn away the enamel and melt the plating, thereby fusing said wires together.

BRIEF DESCRIPTION OF THE DRAWING

FIG. 1 is an illustration of a fine wire coil structure wherein one of the wires and a lead have been joined in accordance with the present invention.

FIG. 2 illustrates a method of providing an electrically conductive brazed joint between a wire and a lead to obtain the joined structure shown in FIG. 1.

DESCRIPTION OF THE PREFERRED EMBODIMENT

FIG. 1 illustrates a spool body 10, having magnet wire windings 11 and 11' mounted at opposite ends. These windings are connected together via portion 11'' and terminate at ends 12 and 13. In order to connect these fine wires to external circuitry, they are first joined to heavier lead wires 14 and 15, respectively. As illustrated in the figure, the end of the fine wire is wrapped around one end of the lead wires and the lead wires in turn are strapped to the body of the spool by insulated straps or pads 16. A partially finished spool manufactured in accordance with the jointing technique of the present invention will take the form of that shown in the figure.

In order to arrive at this finished spool, the following steps are carried out. First, the heavy lead wires 14, 15 are preferably made of nickel or electrically conductive nickel alloy. In particular embodiment leads 14, 15 had a diameter of 0.008 inch. These lead wires were initially prepared by boriding to a thickness of approximately 0.00008 inch. Boriding involves a boron infusion into the surface of the wire, such as by a metalliding process. Following boriding, the lead wires were silverplated to a thickness of from approximately 0.0001 inch to 0.000125 inch. After the heavy lead wires have been prepared as described, the ends of the copper magnet wire are wrapped therearound. The fine magnet wire is coated with a thermally decomposable insulation such as a conventionally used enamel insulation of the polyimide type. When the two wires are assembled in the manner described, an electric current is passed through the lead wire between points on opposite sides of the wrapped portion. This current must be of sufficient intensity to heat the lead wire and the fine wire attached thereto, burn off or thermally decompose the enamel insulation on the fine wire, melt the plating on the lead wire, and thereby fuse the wires together.

It has been found that the heating process should be performed in an atmosphere containing oxygen since the oxygen assists in burning away the enamel insulation.

It has also been found preferable to include the boron metalliding of the nickel lead wire in order to protect the joint from oxidation and to prevent undue embrittlement of the magnet wire. It is believed that the boriding modifies the surface tension of the lead wire and improves the bond between the nickel wire and the silver by preventing the silver from segregating and forming in dispersed lumps.

Also, whereas reference is made to copper or nickel wires, it is understood to encompass alloys thereof which have suitable electrical and heating properties to provide sufficient heating of the nickel wire to result in burn-away of the insulation, melt the copper and produce a brazed silver joint which is electrically conductive.

In a particular apparatus utilized to practice the invention, it was found that the heating could be performed advantageously by use of parallel gap electrodes 17 and 18 energized from a current source 19. The electrodes are brought into contact with the lead wire, 14 or 15, on opposite sides of the wrapped portion as at points A-A'. Sufficient current is then applied through the electrodes while the wire is supported on insulated welding fixture 20 to effect the desired heating between points A-A' to produce burn-away of insulation and fusion of the magnetic wire to the silver coating on the borided nickel wire.

It will be appreciated that certain modifications may be made in the method described herein without departing from the spirit and teachings of the invention. It is contemplated in the following claims to cover all such modifications as fall within the scope thereof.

What I claim as new and desire to be secured by Letters Patent of the United States is:

1. A method of joining at least two wires, wherein one of the wires is of copper and has a thermally decomposable insulation coating, and the other wire is borided nickel or nickel and has a silver coating, comprising wrapping the one wire around the other wire, heating the other wire to burn away said insulation coating, melting said silver and causing the silver to fuse with the copper and provide an electrically conductive brazed joint between the copper and nickel.

2. A method of joining wires according to claim 1, wherein said heating is accomplished by passing electric current through said other wire.

3. A method of joining wires according to claims 1 and 2 wherein said heating is carried out in an atmosphere containing oxygen.

4. A method of joining at least two wires wherein one of the wires is of copper and has a thermally decomposable insulation coating, and the other wire is of nickel comprising boriding the nickel wire, silver plating the borided nickel wire, wrapping the copper wire around the last named wire, heating the last named wire bypassing an electrical current therethrough in the region of the wrapped copper wire to burn away the said insulation coating, melting the silver and causing the silver to fuse with the copper and provide an electrically conductive brazed joint between the copper wire and the nickel wire.